United States Patent [19]

Bakkum et al.

[11] Patent Number: 4,940,776

[45] Date of Patent: Jul. 10, 1990

[54] CATALYTIC POLYMERIZATION OF CARBON MONOXIDE/OLEFIN IN THE PRESENCE OF INSOLUBLE PARTICULATE SOLID MATTER

[75] Inventors: Jacobus A. Bakkum; Gerrit G. Rosenbrand, both of Amsterdam, Netherlands

[73] Assignee: Shell Oil Company, Houston, Tex.

[21] Appl. No.: 338,246

[22] Filed: Apr. 14, 1989

[30] Foreign Application Priority Data

Apr. 27, 1988 [NL] Netherlands ............ 8801095

[51] Int. Cl.$^5$ ............................................. C08G 67/02
[52] U.S. Cl. ................................... 528/392; 525/539
[58] Field of Search ..................... 528/392; 525/539

[56] References Cited

U.S. PATENT DOCUMENTS 3,694,412  9/1972  Nozaki .

FOREIGN PATENT DOCUMENTS 121965  3/1984  European Pat. Off. .
181014  5/1986  European Pat. Off. .
213671  8/1986  European Pat. Off. .
257663  5/1987  European Pat. Off. .

*Primary Examiner*—Harold D. Anderson
*Attorney, Agent, or Firm*—Dean F. Vance

[57] ABSTRACT

An improved process for the production of linear alternating polymers of carbon monoxide and at least one ethylenically unsaturated hydrocarbon in the presence of a catalyst composition formed from a palladium salt, an anion of a non-hydrohalogenic strong acid and a bidentate ligand of phosphorous comprises the addition to the reaction mixture of particulate solid matter of defined physical characteristics.

15 Claims, No Drawings

CATALYTIC POLYMERIZATION OF CARBON MONOXIDE/OLEFIN IN THE PRESENCE OF INSOLUBLE PARTICULATE SOLID MATTER

FIELD OF THE INVENTION

This invention relates to an improved process for the production of linear alternating polymers of carbon monoxide and at least one ethylenically unsaturated hydrocarbon. More particularly, the invention relates to such a process wherein a reduced polymer fouling of the polymerization reactor is observed.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical initiators, e.g., peroxy compounds. U.K. No. 1,081,304 produces similar polymers of higher carbon monoxide content in the presence of alkylphosphine complexes of palladium compounds as catalyst. Nozaki extended the process to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent general processes for the production of such polymers are illustrated by a number of published European Patent applications including Nos. 121,965, 181,014, 213,671, and 257,663. The process generally involves the use of a catalyst composition formed from a Group VIII metal selected from palladium, cobalt or nickel, the anion of a non-hydrohalogenic acid having a pKa below about 6, preferably below 2, and a bidentate ligand of phosphorous, arsenic or antimony. Although the scope of the polymerization process is extensive, a frequently preferred catalyst composition is formed from a palladium salt, particularly palladium acetate, the anion of trifluoroacetic acid or p-toluenesulfonic acid, and a bidentate ligand of phosphorus, particularly 1,3-bis(diphenylphosphino)-propane and 1,3-bis[di(2-methoxyphenyl)phosphino]-propane. The resulting polymers, now considered conventional, are relatively high molecular weight materials having established utility as premium thermoplastics in the production of shaped articles produced by methods which are conventional for thermoplastics.

The process for the production of the linear alternating polymers typically comprises contacting the monomeric reactants, the catalyst composition and a reaction* diluent under polymerization conditions of elevated temperature and pressure and obtaining the polymer product in the form of a suspension in the reaction diluent. The polymer is then recovered by conventional methods such as filtration or decantation. Although the process for polymer production results in efficient production and recovery of polymer product in good yield, the process does result in some degree of reactor fouling as do most if not all polymerization processes. The polymer product that is deposited in the reactor, e.g., on reactor walls and baffle plates, represents an economic loss as well as necessitating the periodic removal of the deposited polymer by mechanical means. It would be of advantage to provide an improved process for the production of linear alternating polymers of carbon monoxide and at least one ethylenically unsaturated hydrocarbon, which process is characterized by a reduced level of reactor fouling.

SUMMARY OF THE INVENTION

The present invention provides an improved process for the production of linear alternating polymers of carbon monoxide and at least one ethylenically unsaturated hydrocarbon in the presence of a catalyst composition formed from a palladium salt, the anion of a non-hydrohalogenic acid having a pKa less than 2 and a bidentate ligand of phosphorous. More particularly, the present invention provides such a process wherein the extent of reactor fouling is lessened by the inclusion within the reaction mixture of particulate solid matter of defined physical characteristics. In a particular modification of the invention, the process is employed to produce compositions comprising a major proportion of the linear alternating polymer and a minor proportion of the particulate solid matter.

DESCRIPTION OF THE INVENTION

It has now been found that when the process for the production of linear alternating polymer of carbon monoxide and at least one ethylenically unsaturated hydrocarbon in the presence of certain palladium-containing catalyst compositions is conducted in the additional presence of a small amount of insoluble particulate solid matter of defined physical characteristics, the extent of reactor fouling is decreased. When the particulate matter is other than a linear alternating polymer of carbon monoxide and at least one ethylenically unsaturated hydrocarbon in finely divided form, the product is a composition comprising a major amount of the product polymer and a minor amount of the particulate solid matter.

The polymers produced according to the process of the invention are the linear alternating polymers of carbon monoxide and at least one ethylenically unsaturated hydrocarbon which are often referred to as polyketones or polyketone polymers. The ethylenically unsaturated hydrocarbons which are useful as precursors of the polyketone polymers have up to 20 carbon atoms inclusive, preferably up to 10 carbon atoms, and are aliphatic such as ethylene and other alpha-olefins including propylene, 1-butene, isobutylene, 1-octene and 1-dodecene, or are arylaliphatic having an aryl substituent on an otherwise aliphatic molecule, particularly an aryl substituent on a carbon atom of the ethylenic unsaturation. Examples of this latter class of ethylenically unsaturated hydrocarbons are styrene, p-methylstyrene, p-ethylstyrene and m-isopropylstyrene. Preferred polyketone polymers are copolymers of carbon monoxide and ethylene or terpolymers of carbon monoxide, ethylene and a second ethylenically unsaturated hydrocarbon of at least 3 carbon atoms, particularly an alpha-olefin such as propylene.

When the preferred terpolymers of carbon monoxide, ethylene and a second hydrocarbon are produced, there will be at least two units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polymers is therefore illustrated by the repeating formula

(I)

wherein G is a moiety of the second hydrocarbon polymerized through the ethylenic unsaturation. The —CO—(CH$_2$—CH$_2$)— units and the —CO—(G)— units are formed randomly throughout the polymer chain and the ratio of y:x is no more than about 0.5. In the modification of the invention where copolymers of carbon monoxide and ethylene are produced the polymers are represented by the above formula (I) wherein y is 0. When y is other than 0, i.e., terpolymers are produced, ratios of y:x from about 0.01 to about 0.1 are preferred. The end groups or "caps" of the polymer chain will depend upon what materials are present during the production of the polymer and how or whether the polymer has been purified. The precise nature of the end groups is of little significance so far as the overall properties of the polymer are concerned so that the polymers are fairly represented by the polymer chain as depicted above.

Of particular interest are the polymers of the above formula having a molecular weight of from about 1000 to about 200,000, particularly those of from about 15,000 to about 150,000. The physical properties of the polymers will depend in part upon the molecular weight, whether the polymer is a copolymer or a terpolymer and, in the case of terpolymers the nature and proportion of the second hydrocarbon present. Typical melting points of such polymers are from about 175° C. to about 280° C., particularly from about 210° C. to about 270° C. Such polymers have a limiting viscosity number (LVN), as measured in m-cresol at 60° C., of from about 0.4 to about 10, preferably from about 1 to about 5.

The polymers are produced in a reaction mixture wherein carbon monoxide and ethylenically unsaturated hydrocarbon are contacted in the presence of a catalyst composition formed from a palladium salt, an anion of a non-hydrohalogenic acid having a pKa below 2 and a bidentate ligand of phosphorous.

The palladium salt is preferably a palladium carboxylate and palladium salts such as palladium acetate, palladium propionate, palladium hexanoate and palladium octanoate are satisfactory. Particularly preferred is palladium acetate.

The anion precursor of the catalyst composition is the anion of a non-hydrohalogenic acid having a pKa below 2. Suitable anions include anions of inorganic acids such as sulfuric acid or perchloric acid as well as anions of organic acids including carboxylic acids, e.g., trifluoroacetic acid, trichloroacetic acid, dichloroacetic acid or difluoroacetic acid, and sulfonic acids, e.g., p-toluenesulfonic acid, methanesulfonic acid or trifluoromethanesulfonic acid. The class of trifluoroacetic acid and p-toluenesulfonic acid comprises a preferred source of the anions of the catalyst composition mixture. The anion is preferably provided in the form of the acid, but in alternate modifications the anion is provided in the form of a salt, particularly a non-noble transition metal salt such as a copper salt. Independent of the form in which the anion is provided, the anion is employed in a quantity of from about 0.5 equivalents to about 50 equivalents per mol of palladium (as the metal). Preferred quantities of anion are from about 1 equivalent to about 25 equivalents per mol of palladium.

The bidentate ligand of phosphorous is a diphosphine of the formula

(II)

wherein R independently is aryl of up to 20 carbon atoms inclusive, preferably of up to 10 carbon atoms. Each R is hydrocarbyl having only atoms of carbon and hydrogen or is substituted hydrocarbyl additionally containing non-hydrocarbyl substituents such as lower alkoxy, dialkylamino or thioalkyl. When non-hydrocarbyl substituents are present, it is preferred that at least one of such substituents are located in a ring position which is ortho to the ring carbon atom connected to the phosphorous. Illustrative of such R groups are phenyl, 2-methoxyphenyl, 2-(dimethylamino)phenyl, 2,4-dimethoxyphenyl and 2-thiomethylphenyl. The R groups phenyl and 2-methoxyphenyl form a preferred class of R groups and particularly preferred as each of the R groups is 2-methoxyphenyl. Bidentate phosphorous ligands of the above formula (II) wherein all R groups are the same are generally preferred. The group R' is a divalent bridging group of up to 10 carbon atoms inclusive having from 2 to 4 carbon atoms, inclusive, in the phosphorous-phosphorous bridge. Illustrative R' groups include 1,2-ethylene (dimethylene), 1,3-propylene (trimethylene), 2,2-dimethyl-1,3-propylene and 2-methyl-1,4-butylene. The preferred R' group is 1,3-propylene and the preferred bidentate ligands are 1,3-bis(diphenylphosphino)propane and 1,3-bis[di(2-methoxyphenyl)-phosphino]propane. Best results appear to be obtained when 1,3-bis[di(2-methoxyphenyl)-phosphino]propane is employed as the bidentate ligand precursor of the catalyst compositions.

The bidentate ligand is provided in an amount of from about 0.5 mol to about 2 mols per mol of palladium. Amounts of bidentate ligand from about 0.75 mol to about 1.5 mol per mol of palladium are preferred.

It is useful, on occasion, to add as an additional component of the catalyst composition a hydroquinone in order to enhance the activity of the catalyst. The hydroquinone will preferably have up to 10 carbon atoms inclusive and benzoquinones, naphthoquinones and anthraquinones are satisfactory. It is generally preferred to employ a 1,4 quinone and particularly preferred is 1,4-benzoquinone. It is not necessary to have hydroquinone present in the mixture from which the catalyst composition is formed, but if present the hydroquinone is provided in an amount up to 1000 mol per mol of palladium and preferably in an amount from about 25 mol to about 250 mol per mol of palladium.

In the conventional processes for the production of polyketone polymers, the polymerization is customarily accomplished in the liquid phase in the presence of an inert reaction diluent. Suitable reaction diluents include lower alkanols such as methanol and ethanol, lower aliphatic ketones including acetone and methyl ethyl ketone, or mixtures thereof. Other diluents may also be present such as aromatic hydrocarbons including toluene and ethylbenzene. The polymerization is conducted under polymerization conditions which typically include an elevated temperature and an elevated pressure. Suitable reaction temperatures are from about 40° C. to about 120° C., preferably from about 50° C. to about 100° C. Typical reaction pressures are from about 20 bar to about 150 bar but more often are from about 30 bar to about 100 bar. Sufficient catalyst is employed to provide from about $1\times10^{-7}$ mol to about $1\times10^{-3}$ mol per mol of ethylenically unsaturated hydrocarbon but preferably from about $1\times10^{-6}$ mol to about $1\times10^{-4}$ mol of palladium per mol of ethylenically unsaturated hydrocarbon to be polymerized and the total molar ratio of the unsaturated hydrocarbon to the carbon monoxide in the polymerization mixture is from about 10:1 to about 1:5, preferably from about 5:1 to about 1:2. The linear alternating polymer is obtained as a suspension in the reaction diluent and is recovered by conventional processes such as filtration or decantation. The polymer is used as such or is purified if desired by contact with a solvent selective for the catalyst residues.

In the improved process of the invention the level of reactor fouling is reduced by including in the reaction mixture, as a suspension in the reaction diluent, a small amount of particulate solid matter of defined physical characteristics. The concentration of such particulate solid matter to be provided is defined by the formula $$Ti\ a\text{-}100(b)(c) \qquad (III)$$

wherein a is the number of grams of solid matter to be employed per liter of diluent, b is the average particle size expressed in meters and c is the bulk density of the solid matter expressed in kilograms per cubic meter. The minimum concentration of solid matter to be used is given by the product of $100(b)(c)$. The presence of a larger concentration of particulate solid matter gives better results up to the point where $a=1000(b)(c)$. A concentration of solid matter larger than this amount does not appear to offer further advantage. Preferred concentrations of particulate solid matter are from about $200(b)(c)$ to about $1000(b)(c)$ with concentrations from about $500(b)(c)$ to about $1000(b)(c)$ being particularly useful. Within the above mathematical relationships, there are some practical restrictions on the terms b and c. A preferred particle size range is from about $1\times10^{-6}$ m to about $1\times10^{-3}$ m, particularly a particle size from about $1\times10^{-6}$ m to about $5\times10^{-3}$ m. In order to have the particulate solid matter suspend in the reaction diluent, the bulk density should be between about 50 kg/m$^3$ and about 1000 kg/m$^3$ but preferably between about 100 kg/m$^3$ and about 500 kg/m$^3$.

In order to reduce reactor fouling, the precise nature of the particulate solid matter is not critical, so long as the solid matter is at least substantially insoluble in the reaction mixture. However, the nature of the particulate solid matter will determine the nature of the product which contains the polymer and the anticipated use for the polymer will dictate the type of particulate solid matter to be employed. If it is desired to produce linear alternating polymer as such, contamination by solid matter of a different character should be avoided. In such cases it is preferred to employ as the particulate solid matter a finely divided linear alternating Polymer, produced elsewhere or by an earlier preparation, of the same general type as the polymer whose production is desired. For example in the production of a linear alternating terpolymer of carbon monoxide, ethylene and propylene, it is useful to employ as the particulate solid matter a finely divided terpolymer of carbon monoxide, ethylene and propylene which had been previously produced. In many instances, the polymer produced will be found to have properties similar to those of the polymer added as solid matter and the resulting polymer containing product, although a mixture of polymers of somewhat different properties, is sufficiently uniform to enable utilization of the polymer without concern over the somewhat heterogeneous character of the polymer.

In an alternate embodiment of the invention, a particulate solid matter is employed which is different in character from the linear alternating polymer and the resulting polymer product will be a composition comprising a major proportion of the linear alternating polymer and a lesser proportion of the particulate solid matter. The composition will be substantially uniform and this modification of the invention is utilized as a method of producing such compositions as well as maintaining a relatively lower level of reactor fouling. When the production of such compositions is desired, the particulate solid matter is suitably inorganic such as silica, alumina, talc or carbon black, or is organic of structure different from the linear alternating polymer including other polymers such as polyethylene, polypropylene or polystyrene or even a second linear alternating polymer of a different structural type, e.g., particulate solid copolymer can be added to terpolymer produced according to the process. As noted above, concentrations of solid matter above $1000(b)(c)$, where b and c have the previously stated meanings, appear to offer no further advantage so far as reduced reactor fouling is concerned. In the modification of the dissimilar process of the invention which produces dissimilar compositions, the concentration of particulate solid matter can be larger and indeed should be larger if necessary to obtain a polymer-containing composition of desired proportions.

The polymer products of the process of the invention are thermoplastics and are processed by methods conventional for thermoplastics, such as injection molding, extrusion and thermoforming into wires and cables, sheets, films as for packaging and shaped articles including containers for food and drink. The properties of a composition-type product will depend in part on the particular polymer and particulate solid matter employed, but the uses of such compositions are well known. For example, compositions comprising linear alternating polymer and inorganic solid are conventionally employed for the production of containers of increased strength.

The invention is further illustrated by the following Comparative Examples (not of the invention) and the following Illustrative Embodiments which should not be construed as limiting the invention. In each case, the polymers produced were linear alternating polymers which, in the case of copolymers had —CO—(—C$_2$H$_4$—)— units in the case of terpolymers had —CO—(—C$_2$H$_4$—)— units and —CO—(—C$_3$H$_6$—)— units occurring randomly throughout the polymer chain.

The average particle size of the solid matter added was found by employing a Particle Size Analyzer ST1800 marketed by Malvern Instruments to obtain a cumulative weight distribution of a representative sample of the solid matter. This cumulative weight distribution is converted to a cumulative surface area distribution by the method of Allen, Particle Size Measurement, Chapman and Hall, London, 1981. The average particle size is found as the median of the cumulative surface area distribution function.

COMPARATIVE EXAMPLE I

A terpolymer of carbon monoxide, ethylene and propylene was produced by charging to a 100 liter autoclave, equipped with a mechanical stirrer, 45 kg of methanol and 3.5 kg of propylene. The contents of the autoclave were heated to 75° C. and an equimolar mixture of carbon monoxide and ethylene was added until a pressure of 45 bar was reached. A catalyst composition solution was then added which comprised 100 ml of methanol, 100 ml of toluene, 0.75 mmol of palladium acetate, 15 mmol of trifluoro-acetic acid and 0.90 mmol of 1,3-bis[di(2-methoxyphenyl)phosphino]propane.

During the polymerization which followed the pressure was maintained at 45 bar by the introduction of an equimolar mixture of carbon monoxide and ethylene. After 47 hours, the polymerization was terminated by cooling the contents of the autoclave to room temperature and releasing the pressure. After the suspension of polymer in reaction diluent had been withdrawn, the autoclave was flushed with 45 liters of methanol to remove any loose polymer remaining in the autoclave. The methanol suspensions were combined and filtered, and the polymer washed with methanol and dried at 50° C. The yield was 5.2 kg of terpolymer having an LVN, measured in m-cresol at 60° C., of 1.88 dl/g, a bulk density of 290 kg/m$^3$ and a melting point of 228° C.

When inspection of the autoclave indicated that terpolymer was deposited on the walls and internals of the autoclave, the terpolymer was removed by mechanical means, washed with methanol and dried at 50° C. The weight of the thus recovered polymer was 1.5 kg, and the calculated percent of reactor fouling was 22%.

COMPARATIVE EXAMPLE II

A carbon monoxide/ethylene/propylene terpolymer was prepared by a procedure substantially similar to that of Comparative Example I except that the quantity of palladium acetate was 0.375 mmol, the quantity of trifluoroacetic acid was 7.5 mmol, the quantity of 1,3-bis[di(2-methoxy-phenyl)phosphino]propane was 0.45 mmol and the reaction time was 44 hours instead of 47 hours.

The yield of polymer from the polymer-containing suspension plus washings was 4.5 kg. The polymer had an LVN, measured in m-cresol at 60° C. of 2.28 dl/g, a bulk density of 65 kg/m$^3$ and a melting point of 230° C. A quantity of 0.7 kg of terpolymer required mechanical means for removal from the autoclave and the percentage of reactor fouling was calculated as 13.5%.

ILLUSTRATIVE EMBODIMENT I

A terpolymer of carbon monoxide, ethylene and propylene was produced by a procedure substantially similar to that of Comparative Example II except that the methanol charged to the autoclave was 35 kg instead of 45 kg, a suspension of a carbon monoxide/ethylene/propylene terpolymer in 10 kg of methanol was added to the autoclave, and the reaction time was 31 hours instead of 44 hours. The added suspended polymer had an LVN, measured in m-cresol at 60° C., of 1.86 dl/g, an average particle size of $1.5 \times 10^{-4}$ m, a bulk density of 65 kg/m$^3$ and a melting point of 229° C.

After polymerization was terminated, the polymer recovered from the product suspension plus washings was 5.8 kg. The terpolymer had an LVN, measured in m-cresol at 60° C., of 2.39 dl/g, a bulk density of 85 kg/m$^3$ and a melting point of 225° C. The polymer remaining in the reactor was 150 g and the reactor fouling was calculated to be 2.7%.

ILLUSTRATIVE EMBODIMENT II

A carbon monoxide/ethylen/propylene terpolymer was produced by a procedure substantially similar to that of Comparative Example I except that (a) 35 kg of methanol was charged to the reactor and followed by a suspension of 1000 g of a carbon monoxide/ethylene/propylene terpolymer in 10 kg of methanol, (b) the catalyst solution comprised 100 ml of methanol, 100 ml of toluene, 0.187 mmol of palladium acetate, 3.75 mmol of trifluoroacetic acid and 0.225 mmol of 1,3-bis[di(2-methoxyphenyl)phosphino]propane, and (c) the reaction time was 90 hours instead of 47 hours. The added suspended terpolymer had an LVN, measured in m-cresol at 60° C., of 2.39 dl/g, an average particle size of $3 \times 10^{-4}$ m, a bulk density of 85 kg/m$^3$ and a melting point of 225° C.

After polymerization was terminated, 7.6 kg of terpolymer was recovered from the product suspension plus washings. The recovered terpolymer had an LVN, measured in m-cresol at 60° C., of 1.86 dl/g, a bulk density of 290 kg/m$^3$ and a melting point of 229° C. The polymer remaining in the autoclave was found to be 150 g and the calculated reactor fouling was therefore 2.2%.

ILLUSTRATIVE EMBODIMENT III

A terpolymer of carbon monoxide, ethylene and propylene was produced by a procedure substantially similar to that of Illustrative Embodiment II except that (a) the weight of added suspended polymer was 375 g and this terpolymer had an LVN, measured in m-cresol at 60° C., of 1.99 dl/g, an average particle size of $1,5 \times 10^{-4}$ m, a bulk density of 305 kg/m$^3$ and a melting point of 226° C., (b) the reaction time was 75 hours instead of 90 hours, and (c) the reaction temperature was 85° C. instead of 75° C.

After polymerization was terminated, 6.375 kg of terpolymer was recovered from the product suspension plus washings. This product terpolymer had an LVN, measured in m-cresol at 60° C., of 1.24 dl/g, a bulk density of 325 kg/m$^3$ and a melting point of 224° C. The polymer remaining in the reactor was 50 g and the calculated reactor fouling was 0.8%.

ILLUSTRATIVE EMBODIMENT IV

A carbon monoxide/ethylene/propylene terpolymer was produced by a procedure substantially similar to that of Comparative Example I except that (a) 1000 g of a carbon monoxide/ethylene/propylene terpolymer (LVN, measured in m-cresol at 60° C.=2.1 dl/g, average particle size =$2 \times 10^{-4}$ m, bulk density=365 kg/m$^3$ and melting point=229° C.) was suspended in the methanol in the autoclave, (b) the reaction temperature was 80° C. instead of 75° C., (c) the catalyst composition solution comprised 100 ml of methanol, 100 ml of toluene, 1.5 mmol of palladium acetate, 30 mmol of trifluoroacetic acid and 1.8 mmol of 1,3-bis[di(2-methoxylphenyl)phosphino]-propane, and (d) the reaction time was 28 hours instead of 47 hours.

After the polymerization was terminated, 12.1 kg of terpolymer was recovered from the product suspension plus washings, and the terpolymer had a bulk density of 365 kg/m$^3$. The polymer remaining in the autoclave was 250 g and the calculated reactor fouling was 2.2%.

COMPARATIVE EXAMPLE III

A carbon monoxide/ethylene copolymer was produced by charging to an autoclave of 300 ml capacity equipped with a mechanical stirrer a catalyst composition solution comprising 150 ml of methanol, 0.1 mmol of palladium acetate, 20 mmol of trifluoroacetic acid and 0.1 mmol of 1,3-bis[di(2-methoxyphenyl)phosphino]propane. After the air in the autoclave had been removed by evacuation, ethylene was introduced until a pressure of 30 bar had been reached and propylene was added until a pressure of 60 bar was reached. The temperature of the reaction mixture was raised to 80° C. and maintained for 5 hours, when polymerization was terminated by cooling to room temperature and by release of pressure. The copolymer formed was found to have been deposited on the walls of the autoclave as a spongy product. In this case, the reactor fouling was 100%, although the polymer was removable by mechanical means.

ILLUSTRATIVE EMBODIMENT V

A copolymer of carbon monoxide and ethylene was produced by a process substantially similar to that of Comparative Example III, except that 0.5 g of silica was suspended in the catalyst composition solution. The silica had an average particle size of less than $10^{-5}$ m and a bulk density of 55 kg/m$^3$.

A copolymer/silica mixture was obtained as a suspension in the methanol diluent. After the mixture was recovered by filtration, it was washed with methanol and dried at 50° C. The amount of the copolymer/silica mixture was 9.5 g. No reactor fouling was observed.

ILLUSTRATIVE EXAMPLE VI

A copolymer of carbon monoxide and ethylene was produced by a procedure substantially similar to that of Illustrative Embodiment V, except that the suspended silica had a bulk density of 60 kg/m$^3$ instead of 55 kg/m$^3$.

The yield of copolymer/silica mixture, after recovery by filtration, washing with methanol and drying at 50° C., was 9.6 g. In this case, the reactor fouling was negligible.

What is claimed is:

1. In the process of producing a linear alternating polymer of carbon monoxide and at least one ethylenically unsaturated hydrocarbon by contacting the carbon monoxide and hydrocarbon in the presence of an inert reaction diluent and a catalyst composition formed from a palladium salt, the anion of a non-hydrohalogenic acid having a pKa below 2 and a bidentate ligand of phosphorus, the improvement which comprises adding to the reaction diluent a small concentration of insoluble particulate solid matter wherein the concentration of the particulate solid matter in the reaction diluent expressed in grams per liter, is equal to or greater than 100 (b)(c), wherein b is the average particle size of the solid matter expressed in meters and c is the bulk density of the solid matter, expressed in kilograms per cubic meter.

2. The process of claim 1 wherein a is greater than 100(b)(c) but less than 1000(b)(c).

3. The process of claim 2 wherein the added particulate solid matter is a linear alternating terpolymer of carbon monoxide, ethylene and propylene.

4. The process of claim 3 wherein the added terpolymer has a particle size of from about $1 \times 10^{-6}$ m to about $1 \times 10^{-3}$ m.

5. The process of claim 4 wherein the added terpolymer has a bulk density between about 50 kg/m$^3$ and about 1000 kg/m$^3$.

6. The process of claim 1 wherein the particulate solid matter is an inorganic solid.

7. The process of claim 6 wherein the inorganic solid is silica.

8. The process of claim 1 wherein the particulate solid matter is an organic polymer structurally different from the linear alternating polymer.

9. In the process of producing a linear alternating terpolymer of carbon monoxide, ethylene and propylene by contacting the carbon monoxide, ethylene and propylene in the presence of an inert reaction diluent and a catalyst composition formed from a palladium salt, the anion of a non-halogenic acid having a pKa below 2 and a bidentate ligand of phosphorous, the improvement which comprises adding to the reaction diluent a small concentration of insoluble particulate solid matter wherein the concentration of the particulate solid matter in the reaction diluent, a, expressed in grams per liter, is equal to or greater than 100(b)(c) wherein b is the average particle size of the solid matter expressed in meters and c is the bulk density of the solid matter expressed in kilograms per cubic meter.

10. The process of claim 9 wherein a is greater than 100(b)(c) but less than 1000(b)(c).

11. The process of claim 10 wherein the added particulate matter is a linear alternating terpolymer of carbon monoxide, ethylene and propylene.

12. The process of claim 11 wherein the added terpolymer has a particle size from about $1 \times 10^{-6}$ m to about $1 \times 10^{-3}$ m.

13. The process of claim 12 wherein the added terpolymer has a bulk density between about 50 kg/m$^3$ and about 1000 kg/m$^3$.

14. The process of claim 9 wherein the added particulate solid matter is an organic polymer of structure different from the terpolymer.

15. The process of claim 14 wherein the added organic polymer is a linear alternating polymer of carbon monoxide and ethylene.

* * * * *